United States Patent [19]

Siegfried

[11]  4,328,018
[45]  May 4, 1982

[54] METHOD AND APPARATUS FOR MAKING OPTICAL FIBER WAVEGUIDES

[75] Inventor: Robert W. Siegfried, Plano, Tex.
[73] Assignee: Corning Glass Works, Corning, N.Y.
[21] Appl. No.: 161,012
[22] Filed: Jun. 19, 1980
[51] Int. Cl.³ .................. C03B 37/07; C03B 37/075
[52] U.S. Cl. ........................................ 65/3.12; 65/144
[58] Field of Search ................. 65/3.12, 144, 18.2; 427/163, 167, 237; 118/724, 725

[56] References Cited

U.S. PATENT DOCUMENTS

| | | | |
|---|---|---|---|
| 3,654,895 | 4/1972 | Bloom et al. | 118/725 |
| 4,117,802 | 10/1978 | Le Sergent et al. | 427/237 X |
| 4,233,045 | 11/1980 | Sarkar | 65/3.12 |
| 4,235,616 | 11/1980 | Siegfried | 65/3.12 |
| 4,263,032 | 4/1981 | Sinclair | 65/3.12 |

FOREIGN PATENT DOCUMENTS 2922795  12/1979  Fed. Rep. of Germany ....... 65/3.12

Primary Examiner—Richard V. Fisher
Attorney, Agent, or Firm—William J. Simmons, Jr.

[57] ABSTRACT

A glass optical fiber waveguide preform is prepared by chemical reaction of vapor ingredients within a bait tube. As the reactants flow through the bait tube, a hot zone traverses the tube to cause the deposition of soot in a section of the tube just downstream of the hot zone. An axially disposed heater, which is located just downstream from the hot zone in the vicinity of the soot deposit, is mechanically coupled to the burner which generates the hot zone. The heater enhances the thermophoresis effect, thereby increasing deposition rate and efficiency. Also, a gas may be flowed over the surface of the heater to confine the reactant vapors to an annular channel adjacent the bait tube wall and to prevent soot deposition on the heater. The heater may comprise an enlarged end portion to cause soot to flow toward the bait tube wall in the deposition region.

10 Claims, 7 Drawing Figures

METHOD AND APPARATUS FOR MAKING OPTICAL FIBER WAVEGUIDES

CROSS-REFERENCE TO RELATED APPLICATION

This application is related to U.S. Patent Application Ser. No. 161,011 for "Apparatus for Making Optical Fiber Waveguides" filed on June 19, 1980.

BACKGROUND OF THE INVENTION

The present invention relates to an improved apparatus for forming blanks from which optical waveguide fibers are drawn.

Certain glass making processes, particularly vapor deposition processes, have been commonly employed in the formation of optical waveguide blanks. In one such process, the source material vapor is directed into a heated tube wherein it reacts to form a material which is deposited in successive layers. The combination of deposited glass and tube is collapsed to form a draw blank which can be later heated and drawn into an optical waveguide fiber.

In order to obtain uniform deposition along the length of the substrate tube, a serial deposition process has been employed. That is, reactants are fed into the end of the tube, but deposition occurs only in a narrow section of the tube immediately downstream from the zone which is heated by a flame. The flame moves up and down the tube to move the reaction and thus the region of glass deposition serially along the tube.

One of the limitations of such a process is a comparatively low effective mass deposition rate. To increase the deposition rate it appears to be necessary to increase the inside diameter of the substrate tube to provide a greater collection surface area. However, since heat is supplied from the outside of the tube, a larger tube diameter results in a lower vapor temperature at the axis of the tube. Moreover, the flow profile across the tube is such that maximum flow occurs axially within the tube. As tube diameter increases, a smaller portion of the reactant vapor flows in that region of the tube adjacent the wall where reaction products are more readily collected on the inner surface of the tube.

Various attempts have been made to increase the deposition efficiency and the rate at which glass is deposited on the inner surface of the bait tube. In U.S. Pat. No. 4,117,802 a hollow cylindrical element is inserted into the downstream end of the bait tube, the closed end of the cylindrical element terminating in the hot zone. The reactants are caused to flow around the cylindrical element and are therefore channeled close to the heated bait tube. Thus, a greater portion of the reactants are said to react and form a part of the glassy deposit on the inner surface of the bait tube. A coolant gas flows through the cylindrical element for the stated purpose of reducing the amount of glass deposited on its surface. It has been found that the effect of the coolant gas would be to increase the deposition of glass soot on the cylindrical member, thus reducing the amount of glass soot available to be deposited on the inner surface of the bait tube and eventually adversely restricting the flow of gases through the annular channel between those two cylindrical members.

An apparatus for increasing the efficiency of glass deposition in a vapor deposition process for making optical waveguide preforms is taught in U.S. Patent Application Ser. No. 913,754 filed June 8, 1978, now abandoned, and entitled "Method of Making Large Diameter Optical Waveguide Preforms", the corresponding West German application having been published Dec. 13, 1979 as Ser. No. 2,922,795. A baffle tube extends into that end of the bait tube into which the reactants flow. The baffle tube, which traverses the bait tube along with the burner, ends just short of the hot zone so that no soot is deposited thereon. A gas flowing from the baffle tube creates a gaseous mandrel which confines the flow of reactant vapors to an annular channel adjacent the bait tube wall in the hot zone, thereby increasing deposition rate and efficiency.

Another apparatus which was developed for the purpose of increasing the efficiency of glass deposition in a vapor deposition process is taught in U.S. Patent Application Ser. No. 963,837 filed Nov. 27, 1978 and entitled "Apparatus and Method for Making Optical Filament Preform", now U.S. Pat. No. 4,233,045. A reactant feed tube extends into one end of the bait tube and terminates just short of the hot zone where reaction occurs. The end of the feed tube traverses the bait tube along with the burner which generates the hot zone. Reactants flow radially from slots in the end of the wall of the feed tube and combine with a flushing gas to form a mixture which flows in a spiral path through the hot zone.

U.S. Patent Application Ser. No. 38,775 filed May 14, 1979 and entitled "Optical Waveguide Manufacturing Process and Article", now U.S. Pat. No. 4,235,616 teaches another apparatus for increasing deposition efficiency. A hollow cylindrical substrate is provided within which is disposed a burner having a substantially radial flame. Reactants are flowed into the hollow cylindrical substrate in the annular space between the inner surface of the substrate and the exterior of the burner. A hot zone is established within the interior of the substrate in the vicinity of the radial flame so that the reactants are reacted to produce a suspension of particulate material. Also, a shield may be provided surrounding the burner within the hollow substrate, and a stream of gas flowed within the shield around the burner to confine the flow of particulate material to an annular channel adjacent to the inner surface of the substrate increasing deposition efficiency of the particulate material on the inside surface of the substrate.

It is therefore an object of the present invention to improve the deposition efficiency of a process whereby a reactant vapor flows into and reacts within a heated tube to form a layer therein.

Another object is to provide an efficient vapor deposition process which is not subject to flow-impeding glass buildups that are inherent in certain prior art processes.

SUMMARY OF THE INVENTION

Briefly, the present invention relates to an apparatus for manufacturing a preform which is intended to be subsequently drawn into an optical fiber waveguide. This apparatus is of the type that includes means for supporting a first tube, and first heating means for heating a portion of the first tube to form a hot zone therein. The apparatus includes means for providing relative longitudinal movement between the first tube and the heating means. Means are provided for introducing into the first tube a reactant gas mixture which flows through the hot zone, and when heated therein, forms particulate material, at least a portion of which flows downstream from the hot zone where at least a portion thereof comes to rest and forms a deposit on the inner surface of the first tube in a region thereof that is cooler than that portion of the first tube that surrounds the hot zone. The improvement of the present invention comprises axial heating means disposed axially in the first tube. At least a portion of the axial heating means is disposed immediately downstream from the hot zone in the vicinity of the deposit of particulate material. Means are provided for maintaining a relatively fixed relation between the first heating means and the axial heating means.

DESCRIPTION OF THE PREFERRED EMBODIMENT

Figure 1:
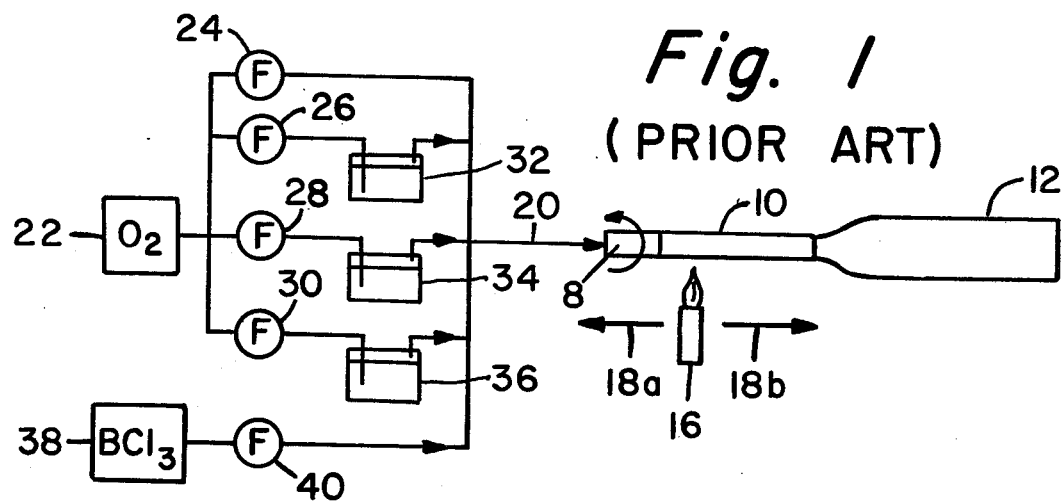
FIG. 1 is a schematic representation of a prior art apparatus for depositing a glass layer within a tube.
Figure 2:
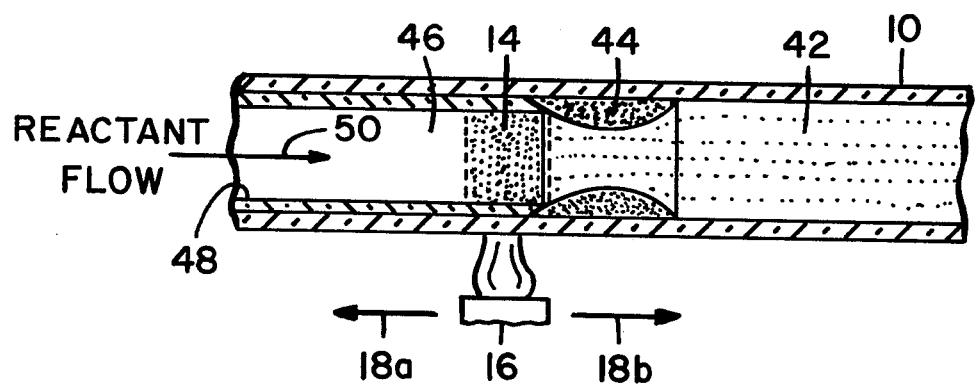
FIG. 2 shows a section of the tube of FIG. 1 depicting observed conditions during processing.

FIGS. 1 and 2 show a prior art system comprising a substrate or bait tube 10 having handle tube 8 affixed to the upstream end thereof and exhaust tube 12 affixed to the downstream end thereof. Tubes 8 and 12 are chucked in a conventional glass turning lathe (not shown), and the combination is rotated as indicated by the arrow. The handle tube 8, which may be omitted, is an inexpensive glass tube having the same diameter as the substrate tube, and it does not form a part of the resultant optical waveguide. A hot zone 14 is caused to traverse tube 10 by moving heating means 16 as schematically depicted by arrows 18a and 18b. The term "hot zone" is often used to refer to that portion of the bait tube which is sufficiently hot to cause it to glow, the temperature of that region being about 1100° C. or greater. The width of the hot zone depends upon such parameters as the size and speed of the burner. Heating means 16 can consist of any suitable source of heat such as a plurality of burners encircling tube 10. Since tube 10 is rotated, the temperature around the circumference is substantially uniform. Reactants are introduced into tube 10 via inlet tube 20, which is connected to a plurality of sources of gases and vapors. In FIG. 1, flow meters are represented by a circle having the letter "F" therein. A source 22 of oxygen is connected by flow meter 24 to inlet tube 20 and by flow meters 26, 28 and 30 to reservoirs 32, 34 and 36, respectively. A source 38 of boron trifluoride is connected to tube 20 by a flow meter 40. Reservoirs 32, 34 and 36 contain normally liquid reactant materials which are introduced into tube 10 by bubbling oxygen or other suitable carrier gas therethrough. Exiting material is exhausted through exhaust tube 12. Not shown is an arrangement of mixing valves and shutoff valves which may be utilized to meter flows and to make other necessary adjustments in composition.

Burner 16 initially moves at a low rate of speed relative to tube 10 in the direction of arrow 18b, the same direction as the reactant flow. The reactants react in hot zone 14 to produce a powdery suspension of particulate oxidic material, often referred to as soot, which is carried by moving gas to region 42 which is downstream from the hot zone. A portion of the soot particles impinges upon and adheres to the bait tube wall, thus causing a soot buildup 44 in that portion of region 42 immediately downstream from the hot zone. The length of the buildup is generally about 1.5-2 times the diameter of the bait tube.

Figure 3:
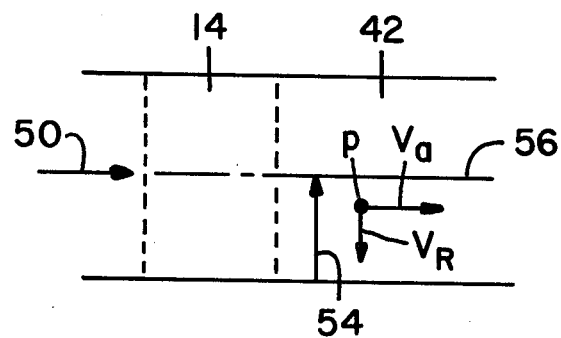
FIG. 3 is a schematic diagram illustrating the velocity components of a particle flowing in the deposition region of a substrate tube.

Because of the relatively high soot deposition efficiencies which have been observed, it has been evident that soot particles produced in region 14 remote from the tube walls are subjected to a force which imparts a radial velocity component to the particles. This phenomenon can be explained by referring to the diagram of FIG. 3. When reactants 50 flow into hot zone 14, soot particles are formed, one of which is shown as particle p. In hot zone 14 particle p and the gaseous products of reaction become heated. Thus, in region 42, wherein the temperature of the wall portion of tube 10 is lower than that of the flowing particles and gases, a temperature gradient exists between the wall and the tube axis 56 as indicated by arrow 54. Particle p has an axial velocity component $V_a$ due to the reactant flow which has the tendency to cause the particle to move through region 42 and into exhaust tube 12. However, the rate of soot deposition in region 42 is sufficiently high as to imply the existence of a force which imparts a velocity component $V_R$ to particle p which drives it toward the wall of tube 10. Of the various possible contributors to radial velocity component $V_R$, the thermophoresis component $V_t$ resulting from temperature gradient 54 has the greatest effect. For a discussion of this effect see the publication, P. G. Simpkins et al. "Thermophoresis: The Mass Transfer Mechanism in Modified Chemical Vapor Deposition", Journal of Applied Physics, Vol. 50, No. 9, September, 1979, pp. 5676-5681.

It is noted that essentially no soot is formed in region 46 of tube 10 upstream from hot zone 14. As burner 16 continues to move in the direction of arrow 18b, hot zone 14 moves downstream so that a part of soot buildup 44 extends into the hot zone and is consolidated thereby to form a unitary, homogeneous glassy layer 48. Such process parameters as temperatures, flow rates, reactants and the like are discussed in the publications J. B. MacChesney et al., Proceedings of the IEEE, 1280 (1974) and W. G. French et al., Applied Optics, 15 (1976). Reference is also made to the text *Vapor Deposition*, Edited by C. F. Powell et al., John Wiley and Sons, Inc. (1966).

When burner 16 reaches the end of tube 10 adjacent to exhaust tube 12, the temperature of the flame is reduced and the burner returns in the direction of arrow 18a to the input end of tube 10. Thereafter, additional layers of glassy material are deposited within tube 10 in the manner described above. After suitable layers have been deposited to serve as the cladding and/or core material of the resultant optical fiber waveguide, the temperature of the glass is increased to about 2200° C. for high silica content glass to cause tube 10 to collapse. This can be accomplished by reducing the rate of traverse of the hot zone. The resultant draw blank is then drawn in accordance with well-known techniques to form an optical waveguide filament having the desired diameter. Alternatively, the uncollapsed blank may be subsequently reheated and the hole collapsed, or the hole may be collapsed during the drawing process.

To optimize the process from the standpoint of reaction, high temperatures are utilized in the deposition process. For the usual silica based system, temperatures at the substrate wall are generally maintained between about 1400° and 1900° C. at the moving position corresponding with the hot zone. Indicated temperatures are those measured by a radiation pyrometer focused at the outer tube surface.

It is commonly known that one of the factors which limits deposition rate is the rate of sintering deposited soot to form a transparent glass layer. For a given composition of glass to be deposited, there is a maximum layer thickness of glass that can be sintered using the optimal combination of hot zone width, peak temperature of the hot zone and burner traverse rate. If the thickness of the sintered glass layer can be kept to the maximum value for different tube diameters, deposition rate increases proportionately with the tube inside diameter because of increased surface area. However, because of the nature of flow dynamics of the reactant vapor stream and soot particle dynamics, the percentage of produced soot which deposits in the substrate tube decreases with increased tube diameter.

Figure 4:
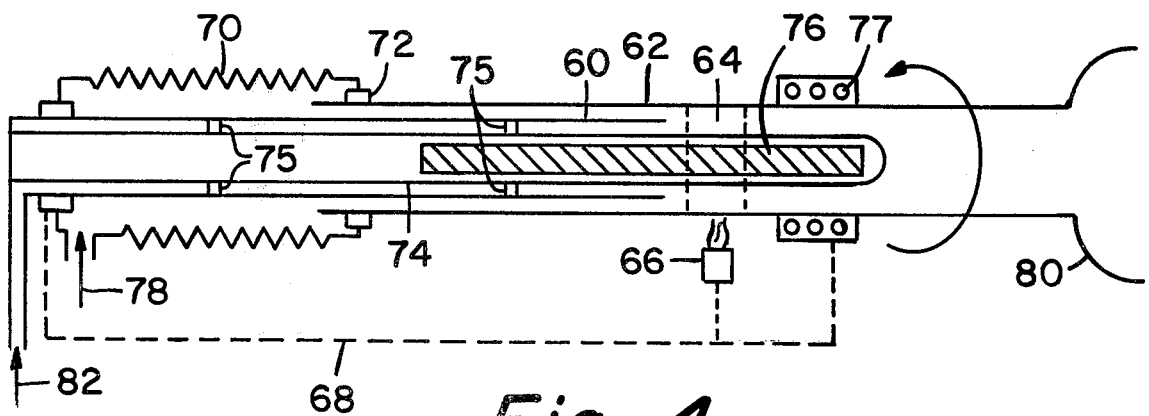
FIG. 4 is a schematic representation of an apparatus constructed in accordance with the present invention.

In accordance with the present invention means is provided for increasing the radial velocity component $V_t$ of the soot particles in that portion of the bait tube just downstream from the hot zone. An apparatus for performing this function is shown in FIG. 4 wherein a portion of gas conducting tube 60 extends into that end of substrate or bait tube 62 into which the reactants are introduced. That portion of tube 60 within tube 62 terminates just prior to the hot zone 64 created by moving heat source 66. Tube 60 is mechanically coupled by means represented by dashed line 68 to burner 66 to ensure that tube 60 is maintained the proper distance upstream of the hot zone 64. Alternatively, the heat source and gas feed tube may be kept stationary, and the rotating substrate tube may be traversed. The input end of tube 62 is connected to tube 60 by a collapsible member 70, a rotating seal 72 being disposed between member 70 and tube 62. Disposed within tube 60 is a heater tube 74 that is supported by radial struts 75. One end of graphite heating element 76, which is located in the end of tube 74, is surrounded by RF coil 77. Heating element 76 need be located only in that portion of tube 74 which extends downstream of hot zone 64; however, it may extend into the hot zone, or it may extend through the hot zone and into the region within tube 60 as shown in FIG. 4. Mechanical connection 68 also connects to coil 77 so that it moves in unison with burner 66 and tubes 60 and 74 relative to tube 62. Although only that portion of graphite susceptor 76 located in the vicinity of coil 77 is heated, it is preferred that element 76 extend a sufficient distance upstream from the hot zone to provide support for tube 74.

If an RF heating element is employed, care must be taken to ensure that other system components are not adversely affected by the RF field. For example, burner 66 must be separated from coil 77 by a sufficient distance to prevent arcing.

Gas conducting tube 60 need not be employed in the basic embodiment of this invention. All that is required in order to obtain increased deposition efficiency due to enhanced thermophoresis effect is an axially disposed heating element in the region of the bait tube immediately downstream from the hot zone. Thus, momentarily ignoring tube 60, the embodiment of FIG. 4 operates as follows. Reactants 78 flow through member 70 and into bait tube 62. Upon reaching hot zone 64 the reactants form soot particles which are carried downstream toward exhaust tube 80. Because the soot particles and other reaction products have been heated in the hot zone, the soot particles are forced toward the cooler bait tube wall just downstream from the hot zone due to the thermophoresis effect described above. However, since the product of reaction cool after leaving the hot zone, the thermophoresis effect rapidly becomes negligible. The heated portion of element 76 is located in the region of tube 62 where most deposition occurs in the conventional process described in conjunction with FIGS. 1 and 2. The end of heater tube 74 preferably extends downstream from the hot zone for a distance of up to two times the bait tube diameter. If the axial heating means extends too far beyond the hot zone, the soot deposit will be unduly lengthened, and the length of the "end effect" will be correspondingly increased. The phrase "end effect" refers to the fact that a portion of the end of the coated bait tube, the length of which is related to the length of the soot deposit, may be of lesser quality than the central region of the coated bait tube, especially when graded index fibers are being formed. Element 76 is heated to a sufficiently high temperature to provide an appropriate thermal gradient over the desired soot deposition region. Thus, deposition can occur in the same region as in the conventional vapor deposition process; however, the radial velocity of the soot is increased, and a larger percentage of available soot is driven to the bait tube wall in the deposition zone.

If the temperature at the surface of tube 74 in the region downstream from hot zone 64 is high enough, little or no soot will deposit thereon because of the high thermal gradient established between tube 74 and the inner surface bait tube 62. The surface of tube 74 can also be protected from soot deposition by flowing a layer of gas over the surface thereof. In FIG. 4, gas 82 flowing from tube 60 provides a barrier to reactants 78 flowing into the hot zone, thereby confining those reactants to an annular channel adjacent the wall of tube 62 in hot zone 64. Gas from tube 60 also functions as a barrier to soot formed in the hot zone and immediately downstream therefrom, thereby decreasing the possibility that such soot will deposit on tube 74. The gas 82 which flows from tube 60 may be any gas that does not detrimentally affect the resultant optical waveguide preform. Oxygen is preferred since it meets this requirement and is relatively inexpensive. Other gases such as argon, helium, nitrogen and the like may also be employed.

Figure 5:
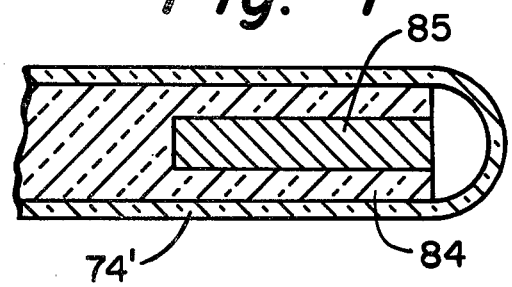
FIG. 5 is a cross-sectional view of a modification of the heating element employed in the apparatus of FIG. 4.

Because of the high operating temperatures within bait tube 62, tubes 60 and 74 should be formed of a refractory material such as alumina, silica or the like. Since optical waveguides generally contain silica, and since other refractory materials may adversely affect the purity of the resultant product, silica is the preferred material. Thus, heater tube 74', which is shown in the embodiment illustrated in FIG. 5, is preferably formed of silica. An alumina rod 84 extends upstream of the hot zone to provide support for tube 74'. Preferably, rod 84 extends upstream of the hot zone for a distance of about three or four times the width of the hot zone. Rod 84 is provided with a bore in the end thereof in which graphite cylinder 85 is disposed. That portion of rod 84 surrounding graphite susceptor 85 absorbs thermal energy radiating from the susceptor. Rod 84 is in good thermal contact with tube 74' so that it can efficiently conduct thermal energy thereto.

Figure 6:
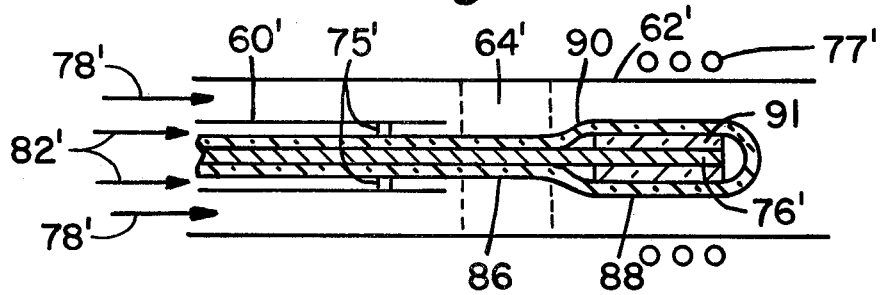
FIG. 6 is a schematic representation of an apparatus similar to that illustrated in FIG. 4 but modified to impart an additional radial velocity component to soot particles.
Figure 7:
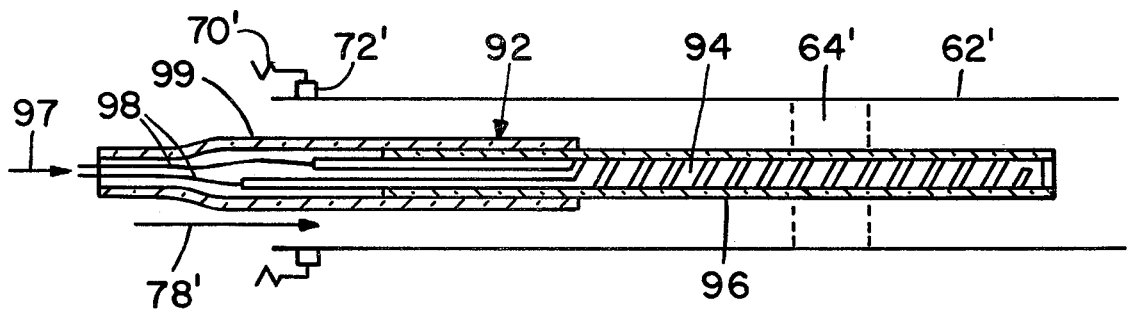
FIG. 7 is a schematic representation of another embodiment of the present invention.

FIGS. 6 and 7 illustrate other heating elements which may be employed in the system of the present invention. Elements similar to those of FIG. 4 are represented in these figures by primed reference numerals.

In the embodiment of FIG. 6 the heater tube 86 is provided with an enlarged end 88 in which the end of heating element 76' is located. A transition region 90 connects the narrower tube 86 with enlarged end 88. The gas 82' flowing between tubes 60' and 86 is directed radially outwardly upon reaching transition region 90, thereby driving the soot formed in region 64' toward the walls of bait tube 62'. Alumina sleeve 91 absorbs thermal energy and conducts it to the wall of end 88 of tube 86.

A resistance heater 92 is illustrated in the embodiment of FIG. 7. In this embodiment, gas conducting tube 60 is not utilized, and the heating element extends from the deposition region through hot zone 64' and into the region upstream of the hot zone. The extension of the heating element upstream of the hot zone is thought to result in a decreased tendency for soot to deposit on the surface of the heater.

Heater 92 comprises a bayonet-type helical silicon carbide heating element 94 which is situated in an alumina tube 96. A commercially available silicon carbide heating element of this type is manufactured by the Carborundum Company and sold under the trademark "GLOBAR". Electrical connection is made to element 94 by conductors 98. The end of alumina tube 96 and the terminal portions of element 94 are disposed in silica tube 99.

To illustrate the improvement in deposition rate and efficiency, deposition systems were operated both with and without an axial heating element therein. Data pertaining to the embodiments of FIGS. 4 and 6 are recorded in Table 1, and data pertaining to Example 7 are recorded in Table 2. In each of Examples 1-15 a 96% silica "VYCOR" brand borosilicate bait tube having an outside diameter of 38 mm and a wall thickness of 2 mm was mounted in a glass turning lathe which rotated at 80 RPM. Apparatus similar to that shown in FIG. 1 was employed to supply the reactant streams, all bubblers being maintained at about 35° C. Ten deposition passes of the burner were made, unless otherwise indicated, and the total deposit thickness was measured. A density of 2.29 g/cm³ was assumed for the deposited glass in order to calculate deposition rate and efficiency. The parameters were calculated using the layer thickness as measured at a point 13 cm from the point at which the bait tube is sealed to the exhaust collector tube. The instantaneous deposition rate D was calculated from observed parameters in accordance with the following equation:

$$D = 2\pi r \rho v d \quad (1)$$

where r is the bait tube inside radius in cm, $\rho$ is the density of the deposited glass in g/cm³, v is the burner traverse rate in cm/min and d is the deposition thickness per pass in cm. In order to calculate the soot production Q, it was assumed that the input chlorides completely reacted to form oxide soot. The soot collection efficiency e was calculated as follows:

$$e = D/Q \quad (2)$$

EXAMPLES 1-5

TABLE 1

| Example | Burner Traverse Rate (cm/min) | Heater Type | D(g/min) |
|---------|-------------------------------|-------------|----------|
| 1 | 18.8 | FIG. 4 | 0.43 |
| 2 | 18.8 | FIG. 4 | 0.46 |
| 3 | 9.4 | FIG. 6 | 0.45 |
| 4 | 9.4 | — | 0.40 |
| 5 | 9.4 | — | 0.33 |

In Examples 1-5 oxygen flowed at the rate of about 5.0 slm through the baffle tube 60. Only two bubblers were employed, one containing $SiCl_4$ and one containing $GeCl_4$. Oxygen flowed at the rate of about 0.5 slm through the $SiCl_4$ and the $GeCl_4$. The amounts of $SiCl_4$ and $GeCl_4$ carried into the bait tube were 1.5 g/min and 2.2 g/min, respectively. Rotameter-type flow meters were employed in these examples. Flows were calibrated by condensing the vapor output in a methanol-dry ice bath. While the absolute calibration of this flow system is uncertain, the flows were not altered significantly during the experiments reported in Table 1, so that inter-run comparisons should be valid. The bypass oxygen flowed at the rate of 0.5 slm. The deposition temperature was about 1800° C.

In Examples 1, 2 and 3 the graphite susceptor was inductively heated to a temperature of about 1250° C., as measured with a filament-type optical pyrometer, but the temperature of the silica enclosure was not measured. The heated region of the susceptor was slightly downstream of the region where the bulk of the deposition normally occurs, due to the necessity for maintaining a minimum distance between the RF coil and the burner to prevent arcing. Example 4 was similar to Example 3 except that the graphite susceptor was not heated in order to ascertain the effect of the air foil shaped bulb 88 in directing soot toward the bait tube wall. In Example 5, no heater tube 74 was employed, but baffle tube 60 was present.

As indicated in Table 1, the deposition rates in Examples 1 through 3 were similar and were about 35% greater than the rate observed in Example 5 which employed only an annular flow of oxygen through the hot zone. In Example 4, a 25% increase in deposition rate over the standard annular flow run of Example 5 was observed, but soot tended to deposit on the unheated tube.

EXAMPLES 6-15

Instead of the rotameters described in the previous examples, electronic flow regulators manufactured by the Tylan Corporation were employed. Oxygen flowed through bubblers containing $SiCl_4$, $GeCl_4$ and $POCl_3$ at the rates of 0.26 slm, 1.1 slm and 0.42 slm, respectively. The reactant flow comprised 1.0 slm bypass oxygen (except Example 15), 1.93 g/min $SiCl_4$, 0.53 g/min $GeCl_4$ and 0.26 g/min $POCl_3$. The deposition temperature was about 1800° C. The calculated soot production Q was based on reactant flows of 1.06 g/min oxide.

TABLE 2

| Example | Burner Traverse Rate (cm/min) | Heater Type | Heater Temp (°C.) | D(g/min) | e |
|---|---|---|---|---|---|
| 6 | 20.3 | FIG. 7 | 1300 | 0.56 | 0.53 |
| 7 | " | " | 1290 | 0.58 | 0.55 |
| 8 | 18.8 | " | 1215 | 0.57 | 0.54 |
| 9 | 20.3 | " | 1110 | 0.55 | 0.52 |
| 10 | " | " | 1110 | 0.50 | 0.47 |
| 11 | " | * | 500–800 | 0.46 | 0.43 |
| 12 | " | FIG. 7 | — | 0.37 | 0.35 |
| 13 | 18.8 | none | — | 0.42 | 0.40 |
| 14 | 20.3 | " | — | 0.39 | 0.37 |
| 15 | " | " | — | 0.32 | 0.30 |

*Nichrome wire wound heater

Examples 6 through 10 and 12 employed a heater element of the type illustrated in FIG. 7. Since alumina tube 96 was partially translucent, the heater temperature as measured by an optical pyrometer was somewhere between the actual temperature of the alumina tube and the surface of the heating element, and the listed temperature represents an upper limit for the temperature of the alumina sheath. The burner traversed the bait tube ten times for each of the Examples 6 through 15 except for Examples 8 and 14 which had six burner passes, Example 6, which had 4 burner passes, Example 12, which had 2 burner passes, and Example 11 which had 1 burner pass. In Example 12, no power was supplied to the heater, and soot collected on the heater. In Examples 6 through 10, flushing gas 97 consisted of about 2 slm helium which was flowed over the heating element to prevent oxidation thereof. A 2 slm helium flush was also employed in Example 7 even though no power was applied to the heater.

In Examples 6 through 10, the temperature of the heating element was decreased from about 1300° C. to about 1110° C. Table 2 indicates that the deposition rate D and the soot collection efficiency e both generally decreased with decreasing heater temperature. To illustrate the effect of a relatively low temperature heater, a nichrome wire heating element in an alumina sheath was employed in Example 11. The temperature of the heater in Example 11 was determined to be between about 500–800° C. The nichrome wire melted after one pass of the burner. Because of the lower heater temperature in Example 11, the values of D and e were considerably lower than those values which were obtained in Examples 6 through 10 wherein temperatures above 1100° C. were employed.

When no power was applied to the heater element of FIG. 7, the deposition rate decreased to 0.37 g/min and the efficiency dropped to 35%. Because the heater was cool and was situated just downstream from the hot zone, soot collected thereon. No soot collected on the low temperature heater of Example 11 since the thermophoresis effect generated by that heater was sufficient to cause the soot just downstream from the hot zone to flow toward the cooler bait tube walls.

Examples 13, 14 and 15 are given so that the performance of the apparatus of FIG. 7 can be compared with various types of prior art deposition systems. In Examples 13 and 14, a 2.0 cm annular flow baffle tube similar to tube 60 of FIG. 4 was employed. Oxygen flowed through the axially disposed baffle tube at the rate of 5.0 slm. The soot collection efficiency decreased to about 39% for this embodiment as compared to about 54% for the embodiment of FIG. 7.

In Example 15, the standard vapor deposition apparatus of FIG. 1 was employed. In this example, the bypass oxygen flowing through flow meter 24 was increased from 1.0 slm to 2.0 slm to prevent upstream soot deposition which would have otherwise occurred. In this example, the soot collection efficiency was only 30%.

Because different types of flow meters were employed in the collection of data for Tables 1 and 2, data from one table should not be compared with data from the other. However, comparisons made among examples in each table are valid.

The data reported in the tables indicate that as the temperature of the heater is increased, deposition rates and efficiencies increase. In Example 12, the no-heat case, a deposition rate lower than that for the annular flow process of Examples 13 and 14 is due to soot collection on the relatively cold heater. In Example 11 the heater was hot enough to prevent soot collection on itself but significantly cooler than for other examples employing a hot heater element, and a deposition rate between the annular flow rate and the rate with the hottest heater was observed. The correlation of deposition rate with heater temperature suggests that enhanced thermophoresis is in fact responsible for the observed increase in deposition rate. It is also evident that this increase in rate has not occurred simply by the fact that the soot is effectively concentrated near the walls by the physical presence of the heater.

What is claimed is:

1. In an apparatus for manufacturing an optical preform, which apparatus includes
    means for supporting a first tube,
    first heating means for heating a portion of said first tube to form a hot zone therein,
    means for providing relative longitudinal movement between said first tube and said heating means, and
    means for introducing into said first tube a reactant gas mixture which flows through said hot zone and, when heated therein, forms particulate material, at least a portion of which flows downstream from said hot zone where at least a portion thereof comes to rest and forms a deposit on the inner surface of said first tube in a region thereof that is cooler than that portion of said first tube that surrounds said hot zone,
    the improvement comprising:
        axial heating means disposed axially in said first tube, at least a portion of said axial heating means being disposed immediately downstream from said hot zone in the vicinity of said deposit, said axial heating means extending downstream from said hot zone for a distance of up to two times the diameter of said first tube, and
        means for maintaining a relatively fixed relation between said first heating means and said axial heating means.

2. An apparatus in accordance with claim 1 wherein said axial heating means comprises a second tube, one end of said second tube extending into that end of said first tube into which said reactant gas mixture is introduced and terminating downstream of said hot zone, a heating element, at least a portion of which is disposed in the end of said second tube which extends downstream of said hot zone, said reactant gas mixture flowing through the hot zone in an annular channel between said first and second tubes.

3. An apparatus in accordance with claim 2 further comprising an RF heating coil surrounding said first tube in the vicinity of the end of said second tube, said heating element comprising an RF susceptor.

4. An apparatus in accordance with claim 2 wherein said heating element comprises a resistance heating element.

5. In an apparatus for manufacturing an optical preform, which apparatus includes means for supporting a first tube, first heating means for heating a portion of said first tube to form a hot zone therein, means for providing relative longitudinal movement between said first tube and said heating means, and means for introducing into said first tube a reactant gas mixture which flows through said hot zone and, when heated therein, forms particulate material, at least a portion of which flows downstream from said hot zone where at least a portion thereof comes to rest and forms a deposit on the inner surface of said first tube in a region thereof that is cooler than that portion of said first tube that surrounds said hot zone, the improvement comprising:

a second tube, one end of said second tube extending axially into that end of said first tube into which said reactant gas mixture is introduced and terminating downstream of said hot zone in the vicinity of said deposit, a heating element, at least a portion of which is disposed in the end of said second tube which extends downstream of said hot zone, a third tube, one end of said third tube being disposed within said first tube, said one end being open and terminating upstream of said hot zone, said second tube extending through said third tube and being spaced therefrom, said reactant gas mixture flowing between said first and third tubes, means for flowing a gas through the region between said second and third tubes and over the end portion of said second tube, and means for maintaining a relatively fixed relation between said first heating means and said second and third tubes.

6. An apparatus in accordance with claim 5 wherein the diameter of that portion of said second tube downstream of said hot zone is greater than the diameter of the remaining portion of said second tube whereby said gas flowing from said third tube is provided with a radial velocity component as it flows from the smaller to the larger diameter portions of said second tube.

7. In an apparatus for manufacturing an optical preform, which apparatus includes means for supporting a tube, means for heating a portion of said tube to form a hot zone therein, means for introducing into one end of said tube a reactant gas mixture which flows through said hot zone and, when heated therein, forms particulate material, at least a portion of which flows downstream from said hot zone where at least a portion thereof comes to rest and forms a deposit on the inner surface of said tube in a region thereof that is cooler than that portion of said tube that surrounds said hot zone, and means for providing movement between said tube and said heating means, the improvement which comprises:

an axial heater, one end of said axial heater being disposed within said tube, means for moving said one end of said axial heater with respect to said tube, and means for maintaining a relatively fixed relation between said heating means and said one end of said axial heater, said one end of said axial heater extending beyond said heating means for a distance of up to two times the diameter of said tube, whereby the regions of said deposit at the end of said tube, which are of lower quality than the remainder of said deposit, are of reduced length.

8. In the method of manufacturing an optical preform, which includes the steps of passing through a first tube a gas which, when heated, forms glass particles, and moving a heat source along the outside of said first tube whereby at least a portion of said gas is converted to particulate material and at least a portion of said particulate material is deposited on the inside of said tube, the improvement which comprises:

moving an axially located heater within said first tube while maintaining the end of said heater, which is within said first tube, in fixed relation to said heat source and downstream of said heat source, positioning a second tube within said first tube such that said heater extends from a first end of said second tube, maintaining said first end of said second tube a fixed distance upstream of said heat source, flowing said gas between said first and second tubes, and flowing a second gas through said second tube and over the surface of said axial heater.

9. In the method of manufacturing an optical preform, which includes the steps of:

passing through a first tube a reactant gas which, when heated, forms particulate material, and moving a heat source along the outside of said first tube to form a hot zone therein whereby at least a portion of said gas is converted to particulate material and at least a portion of said particulate material flows downstream from said hot zone where at least a portion thereof is deposited on the inside of said first tube in a region of said first tube that is cooler than that portion of said first tube adjacent to said heat source, the improvement which comprises:

positioning a heater coaxially within said first tube such that a first end of said heater is within said first tube and extends downstream from said hot zone for a distance of up to two times the diameter of said first tube.

reciprocatingly moving said first end of said heater, and maintaining said first end of said heater a fixed distance downstream of said heat source.

10. The method of claim 9 further comprising the steps of positioning a second tube within said first tube such that said heater extends from a first end of said second tube, maintaining said first end of said second tube a fixed distance upstream of said heat source, flowing said reactant gas between said first and second tubes, and flowing another gas between said second tube and said heater.

* * * * *